United States Patent Office 3,442,899
Patented May 6, 1969

3,442,899
TREATMENT OF ARTERIOSCLEROTIC AND ARTERIOSPASTIC DISEASES WITH 1-(β-HYDROXYETHYL) 2-METHYL - 5 - NITRO-IMIDAZOLE
James B. Mercer, Merriam, Kans.
(13109 W. 95th St., Lenexa, Kans. 66215)
No Drawing. Filed May 5, 1967, Ser. No. 636,275
Int. Cl. A61k 27/00
U.S. Cl. 424—273        4 Claims

ABSTRACT OF THE DISCLOSURE

The administration internally to mammals particularly humans of a pharmaceutically effective dosage of a pharmaceutical compound having as the essentially active ingredient a potent arterial vasodilator which is readily absorbable from intestinal tracts, such as Metronidazole which is (1 - (β - hydroxyethyl) - 2 - methyl - 5 - nitroimidazole, or (1 - (2 - hydroxyethyl) - 2 - methyl - 5- nitroimidazole), the dosage being in the range of 75 to 250 mgs. of metronidazole with amounts administered being 125 mgs. to 1000 mgs. per day or twenty-four hour period. Many persons, particularly as they age, suffer from arteriosclerotic and arteriospastic diseases which may become evident by various conditions resulting from improper or lack of suitable blood circulation, as for example, extremities such as hands and feet may become cold, the person may have a distinct feeling of weakness, anxiety, or the impaired circulation may result in chest pains, shortness of breath, also, inability to sleep, slowing mental activity, reduced visual acuity, and in many instances, permanent disabilities may result. Heretofore there has been a lack of suitable prophylactic and therapeutic treatment of many types of arteriosclerotic and arteriospastic diseases in the human arterial system.

---

The objects of the present invention are to provide a method for systematically treating arteriosclerotic and arteriospastic diseases in the human arterial system; to provide such a method of treatment in which an effective pharmaceutical composition is administered internally; to provide such a method wherein the dosage is provided by oral administration of tablets; and to provide such a method that is suitable for a long term therapy and that may be used intermittently where desirable.

It is well known that types of arteriosclerotic and arteriospastic diseases in the human arterial system causes changes in said system that have an adverse effect upon the health of the person. Some of the arterial changes are apparently clinically reversible in their early stages and persons having a predisposition to arterial disease may be aided by clinical trial and evaluation from a prophylactic standpoint. It appears that a vasodilatory action on the arteries and arterioloes of the human arterial system is helpful in the treatment of some types of the diseases in the arterial system. It is found that a composition of metronidazole which is((1-(β-hydroxyethyl)-2-methyl-5-nitroimidazole)), or (1-(2-hydroxyethyl)-2-methyl-5-nitroimidazole), is a potent vasodilatory drug that is capable of acting on the arteries and arterioles, of the human arterial system. This compound is readily absorbable from intestinal tract making it possible to be used by oral administration.

In tests of this vasodilatory drug fundoscopic examination reveals that blood vessels in spasm become dilated as evidenced by their increase in diameter and those vessels which are arteriosclerotic appear to improve or respond to treatment on a time basis as to their size and calibre, also, there appears to be some decrease in the amount of arteriosclerosis present in these vessels. Metronidazole is safe for ingestion by humans as it has been heretofore used as an effective treatment for trichomonal vaginitis, urthritis, cervicitis and prostatitis.

In the treatment of arteriosclerotic and arteriospastic diseases in the human arterial system, it is preferred that the vasodialatory drug be administered orally at regular intervals, and while the dosage may vary, it has been found that a dosage in the form of a tablet in the range of 75 mgs. to 250 mgs. from two to four times daily is an effective therapeutic treatment. It is preferred that the amount of metronidazole administered be in the nature of 125 mgs. to 1000 mgs. per day or twenty-four hour period. It is considered that the treatment should be a long term therapy and therefore after decrease in the amount of arteriosclerosis present or indication of such decrease the dosage may be reduced and the patient observed to determine the minimal dosage to maintain the patient's condition.

In the clinical results it has been found that in human adults who have marked impairment of the following types of arteriosclerotic and arteriospastic human arterial disease such as cerebral vascular insufficiency, cerebral arteriosclerosis, some arterial diseases of the eye with impairment of visual acuity, moderate to advanced peripheral artery disease, ischemic heart disease, diabetic patients who have generalized arterial vascular changes in certain affected organ systems, and disease of central nervous system which have their impairment due to impaired arterial circulation, some have had good to marked improvement in their condition.

It has been found that in the treatment of human adults using the dosage in the range of 125 to 250 mgs. two to four times daily for approximately ten to ninety days some of the persons being treated showed response by a distinct warming of the entire body, especially the extremities such as hands and feet which had theretofore been cold for long periods, even months or years. Other persons exhibited a distinct feeling of increase in strength and endurance to perform tasks resulting in physical labor, many of which would not have been attempted prior to the treatment with said vasodilatory drug. Persons also exhibited a distinct feeling of well being, less anxiety and being able to sleep better at night. There have been partial or complete clearing of numbness in extremities which may have followed a stroke or had been present for months or years prior because of impaired circulation. There have also been indication of increase in the treated person's mental acuity and in their ability to remember recent events and long forgotten events not remembered for some time. There have been indication of an increase of visual acuity. Some of the treated persons have had a decrease in frequency of exertional shortness of breath with or without substernal chest pain, the latter which may completely disappear.

As an example of dosages, an adult patient can tolerate 250 mgs. of medication three times daily for four weeks and at that time it is preferred to reduce the dosage to 125 mgs. four times daily and thereafter further decrease in dosage is preferred depending on the tolerance of the patient and the absence of symptoms. This reduction being to provide a minimal maintenance dose which is individualized depending upon the sensitivity of the patient to side effects and to response of the patient, said maintenance dose maybe reduced to as low as 125 mgs. per day. Also, it is possible that in some patients it may be desirable to increase the dosage to more than 1000 mgs. per day if conditions justify.

As to the side effects of the treatment, it has been observed that in some instances the person experiences some nausea but generally the nausea will disappear after a few weeks. In rare instances there has been a slight soreness of the mouth or a white tongue and in such instances the dosage should be temporarily reduced. There may be some dryness of the mouth and vagina occasionally and a few may complain of a bad taste in their mouths.

In the treatment of the diseases in the human arterial system it is preferred that certain contraindications be observed, for example, it is thought that the treatment should not be given during pregnancy even though there is no evidence that fetal damage has occurred. A person should not be treated where there is evidence or history of blood dyscrasia or patients with active disease of the central nervous system (of nervous tissue origin) but these do not include those where the disease is present because of vascular impairment. It is thought that patients should not be treated where they have advanced cirrhosis of the liver or sarcoidosis. The treatment should never be used at the same time with Antabuse or Nitrofurans, also the treatment should be only intermittent when the patient is being administered certain drugs which are hepatotoxic. There should be no treatment if there is any prior sensitivity in the patient as to anticoagulants. Also, there should be no concurrent use by the patient of ethyl alcohol in any form whatsoever.

Treatment should be discontinued if there is a depression of the granulocytic cells reflected in white and differential blood counts to below the normal limits, or if the patient develops a rash or petechiae or other indications of severe allergic nature. It is also thought that certain precautions should be observed, namely, the dosage should be either reduced or discontinued if the patient develops a white tongue or a sore mouth due to monilia which does not respond to immediate anti-fungal treatment. If the patient has had or is given antibiotic therapy it should be closely followed and anti-fungal agent used to prevent the development of monilia. It is recommended that a white blood count and differential examination be made after the first four weeks of therapy, then monthly white blood counts and differentials for the next three months then bimonthly to detect any change in granulocytic series. If the patient is on a concurrent anti-coagulant therapy he must be closely followed however as yet there has been no evidence of marked changes in the Quick prothrombin time.

As examples of response to treatment, an adult person suffering from dizzy spells, periods of weakness, palpitation of the heart, and pains in one wrist volar surface and chest pains of constricting character was treated. The treatment started by oral administering of compressed tablets having 250 mgs. of Metronidazole three times daily. Before the treatment the person had a blood pressure of 170/80 and after eleven weeks the blood pressure was 120/70. After the second week the pain in the wrist and chest pain started lessening. After eleven weeks treatment there was noted a visual acuity improvement from Jaeger #2 and #3 size to #1 at 20 inches. The persons work capacity doubled, memory and mental acuity improved and episodes of shortness of breath and dizziness were no longer experienced. At the end of the eleven week treatment the dosage was reduced to a maintenance dose of 125 mgs. of Metronidazole three times daily with the improved condition of the person continuing.

A person suffering severe arthritic changes in shoulders and hands and also having anginal pain was on medication of 1/150 nitroglycerin sublingual every 15 minutes for three doses for relief of the anginal pain. Attacks occurred on an average of one per week. The person was treated with one tablet having 250 mgs. Metronidazole twice daily and there was a decrease in the attack with only two episodes of angina in the following fifteen weeks. Also there was increased ability to move the hands.

It is believed obvious that there may be variations in the conditions and toleration of humans having diseases in the arterial system and that the method described is a prophylactic and therapeutic treatment of arteriosclerotic and arterisopastic diseases in the human arterial system but it is not to be limited to the specific form and dosages herein described except insofar as much limitations are included in the claims.

What I claim and desire to secure by Letters Patent is:

1. The method of treating arteriosclerotic and arteriospastic diseases in the arterial system of humans which comprises the systemic oral administration to humans having such diseases of a therapeutic composition comprising a pharmaceutical composition containing as an essentially active ingredient 1-($\beta$-hydroxyethyl)-2-methyl-5-nitroimidazole.

2. The method as set forth in claim 1 wherein the amount of 1 - ($\beta$ - hydroxyethyl) - 2-methyl-5-nitroimidazole, is in the range of 125 mgs. to 1000 mgs. per day.

3. The method as set forth in claim 1 wherein the dosage for adult humans is in the range of 75 mgs. to 250 mgs. of 1 - ($\beta$ - hydroxyethyl)-2-methyl-5-nitroimidazole.

4. The method as set forth in claim 1 wherein the dosage for adult humans is in the range of 75 mgs. to 250 mgs. of 1-($\beta$-hydroxyethyl)-2-methyl-5-nitroimidazole at from two to four times each twenty-four hours.

References Cited

Grollman, Pharmacology and Therapeutics, 6th ed. (1965), p. 814.

FRANK CACCIAPAGLIA, JR., *Primary Examiner.*

STANLEY J. FRIEDMAN, *Assistant Examiner.*